United States Patent
Schmidt

(10) Patent No.: US 7,487,183 B1
(45) Date of Patent: Feb. 3, 2009

(54) GROUPED FILTER RULES FOR WORKFLOW APPLICATION UPDATE NOTIFICATIONS

(75) Inventor: Jeffrey Alan Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/062,454

(22) Filed: Apr. 3, 2008

(51) Int. Cl.
G06F 17/30 (2006.01)

(52) U.S. Cl. .................. 707/104.1; 709/205; 707/9; 707/10; 715/751

(58) Field of Classification Search .............. 707/3, 707/6, 9, 10, 104.1; 709/203, 205, 206, 217, 709/227; 705/5, 7, 8, 9; 715/808, 751
See application file for complete search history.

(56) References Cited

U.S. PATENT DOCUMENTS

| | | | | |
|---|---|---|---|---|
| 5,220,657 | A  * | 6/1993 | Bly et al. | 711/152 |
| 6,092,048 | A  * | 7/2000 | Nakaoka | 705/9 |
| 6,493,755 | B1 * | 12/2002 | Hansen et al. | 709/224 |
| 6,678,698 | B2 * | 1/2004 | Fredell et al. | 707/104.1 |
| 6,751,657 | B1 * | 6/2004 | Zothner | 709/220 |
| 6,996,402 | B2 * | 2/2006 | Logan et al. | 455/456.1 |
| 7,065,493 | B1 | 6/2006 | Homsi | |
| 7,200,636 | B2 * | 4/2007 | Harding | 709/206 |
| 7,213,058 | B1 * | 5/2007 | Torres et al. | 709/219 |
| 7,302,674 | B1 * | 11/2007 | Gladieux et al. | 717/101 |
| 7,305,392 | B1 * | 12/2007 | Abrams et al. | 707/9 |
| 2002/0156879 | A1 | 10/2002 | Delany et al. | |
| 2004/0010519 | A1 | 1/2004 | Sinn et al | |
| 2004/0054569 | A1* | 3/2004 | Pombo et al. | 705/7 |
| 2004/0078373 | A1 | 4/2004 | Ghoneimy et al. | |
| 2005/0108151 | A1 | 5/2005 | York | |
| 2007/0118599 | A1* | 5/2007 | Castanho et al. | 709/204 |
| 2007/0127667 | A1 | 6/2007 | Rachamadugu | |

OTHER PUBLICATIONS

Wahyudin et al., "In time roles-specific notification as formal means to balance agile practices in global software development settings", CEE-SET 2007.*

Meng et al., "Achieving dynamic inter-organizational management by integrating business processes, events and rules", IEEE, 2002.*

* cited by examiner

*Primary Examiner*—Jean M Corrielus
(74) *Attorney, Agent, or Firm*—MaxValue IP, LLC

(57) ABSTRACT

To reduce the amount of additional coding required each time end users request new email notifications, based on a combination of specific field values, a new process for end-user email notifications is used to provide the user or database owner/administrator the ability to create these specific rules more easily. Each time an update is done in the master work flow document, the new process cycles through the filter rules and will provide the relevant email to the end-user. Other embodiments or examples are also discussed.

1 Claim, 2 Drawing Sheets

Block A

| | |
|---|---|
| Notify Type : | 4 Hr Large System | 202 |
| Description: | |
| Select Fields: | Hrs Down,Geog,Area,Model |

| | |
|---|---|
| Hours: | 4.5 | 204 |
| Geog: | United Kingdom, USA | 206 |
| Area | HW   FW   SW |
| Model | pSeries MMA Legacy 870 | 208 |
| Client | Customer 12345 | 210 |

| | |
|---|---|
| HW | CPU 550/570 |
| Notify Name(s) | abc@mycompany.com | 212 |

Block A

| | |
|---|---|
| Notify Type : | 4 Hr Large System | ~202
| Description: | |
| Select Fields: | Hrs Down,Geog,Area,Model |

---

| | |
|---|---|
| Hours: | 4.5 | ~204
| Geog: | United Kingdom, USA | ~206
| Area | HW    FW    SW |
| Model | pSeries MMA Legacy 870 | ~208
| Client | Customer 12345 | ~210

---

| | |
|---|---|
| HW | CPU 550/570 |
| Notify Name(s) | abc@mycompany.com | ~212

FIG 2

GROUPED FILTER RULES FOR WORKFLOW APPLICATION UPDATE NOTIFICATIONS

BACKGROUND OF THE INVENTION

Let us consider a situation in which end-users requesting specific email notifications based on selection criteria that differ from user to user. The existing solutions are based on hard coding (LotusScript) decision tree, which means that with each new user request, it can add another level of complexity.

The drawback is that, for each additional item of information (field value), it requires another level in the decision tree, making the addition of new values or specific user requests difficult and complex to code and maintain.

A new solution is to design a new process to allow an end-user (or database process owner/administrator) to create specific notifications rules based on one or more criteria that the end user requires. The new solution gives users the ability to request notifications based on an almost endless combination of field values that they require.

SUMMARY OF THE INVENTION

An embodiment of this invention provides features to reduce the amount of additional coding required each time end users request new email notifications based on a combination of specific field values, a new process for end user email notifications, is used to provide the user or database owner/administrator the ability to create these specific rules more easily. Each time an update is done in the master work flow document, the new process cycles through the filter rules and will provide the relevant email to the end user. A further embodiment of this solution provides many advantages:

1. Off-load end user requests (or changes to existing rules) to the end user or database owner/administrator.
2. Provides an easy to use interface for creation of or changes to existing rules as opposed to further coding on the decision tree by the database designer.
3. Gives end users an almost limitless combination of values to create the exact rule they want.
4. Notifications can include groups of users, or as specific as what one end user requires based on their specific criteria.

BRIEF DESCRIPTION OF THE DRAWINGS

FIG. 2 is a schematic diagram illustrating sample filter rule.

DETAILED DESCRIPTION OF THE PREFERRED EMBODIMENTS

Figure 1:
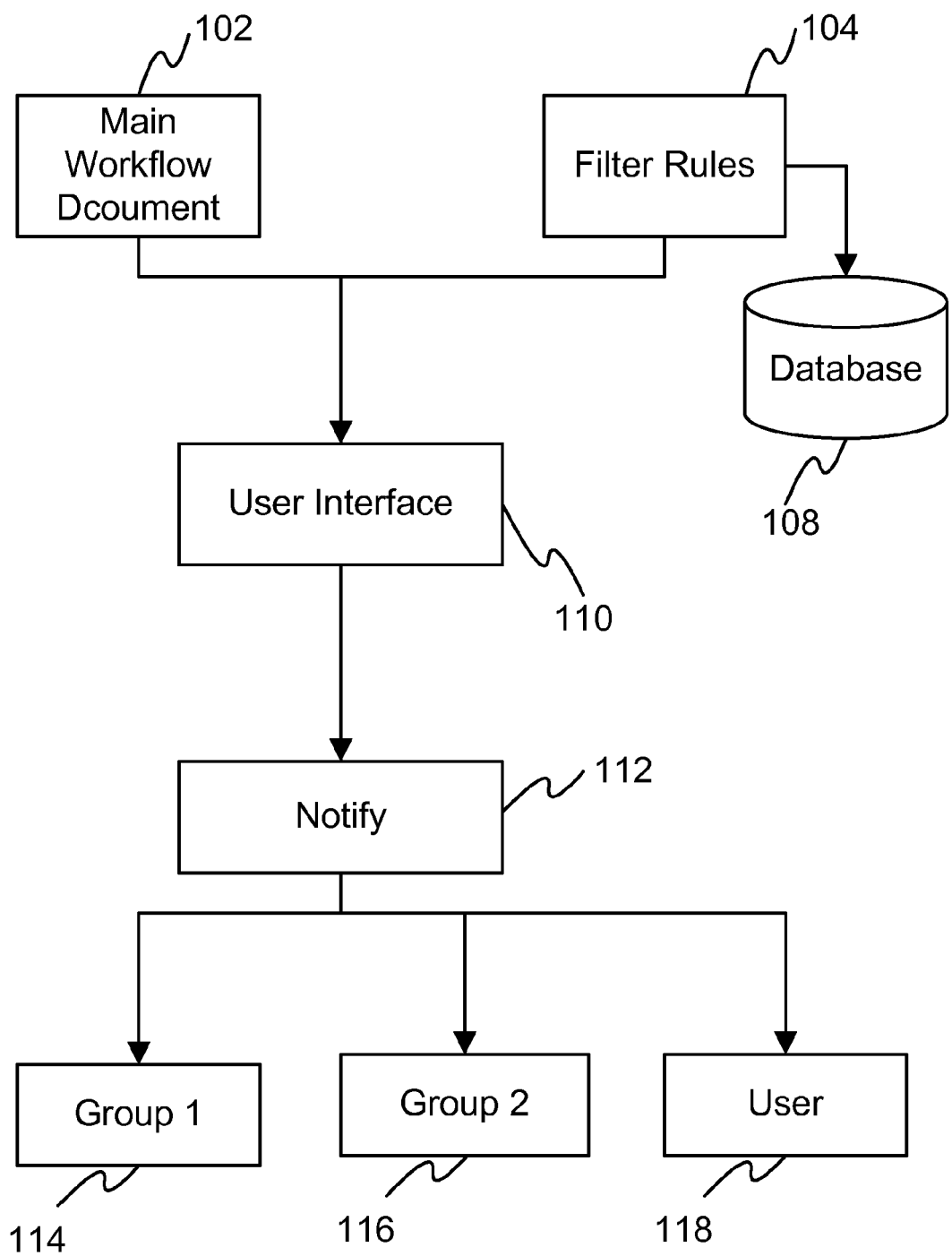
FIG. 1 is a schematic diagram of the grouped filter rules for workflow application.

An embodiment of invention provides a design of a new process to work around a Notes view with documents for an easy user interface. These documents are called 'Filter Rules'. Each filter rule is created using one or more field values that will be used to compare to the master work flow document. Some of these fields are single value fields, others are multi value fields. If it is a multiple value field, the user has the choice to select one or more values from that field.

An embodiment of the invention is a method (FIG. 1) of the grouped Filter Rules for Workflow Application. In one embodiment, the invention provides an easy to use interface (110) for creation of or changes to existing rules (104) as opposed to further coding on the decision tree by the database designer. Gives end users an almost limitless combination of values to create the exact rule they want. Notifications (112) can include groups (114 and 116) of users, or as specific as what one end user (118) requires based on their specific criteria. In one embodiment, the system stores the filter rules in a database (108). The above filter rule (104) would take each field and compare against the corresponding fields in the main work flow document (102).

FIG. 2 is a schematic diagram illustrating an embodiment of a Sample Filter Rule. This is a sample (Block A) of some of the field values provided for the end user to build up a rule document. This in itself is not a unique thing, being similar to subscribing to specific news groups feeds or news items. The system uses this document to compare against the main work flow document. This application designed for, the main work flow document is very time sensitive so updates are done on an hourly basis. The above filter rule would take each field and compare against the corresponding fields in the main work flow document. If it meets the requirements of each field being compared then it will send the email notification to those listed. For fields with multi value choices, the system considered it a match if one value matches what is in the main work flow document. This allows end users to be generic and get notifications based on only one value like geography (206) involved, or number of hours (204) since the main work flow document was created. Or, the user could get very specific, and create a complex set of rules, down to a single customer name (210) with a specific system type (208), release, and only in certain geographies (206). This technique provided a much easier solution than by hard coding a decision tree for up to 10 different field values, and it allows the end user to create very specific sets of rules to receive a notification. We also found value in being so specific that we were able to only notify or page off shift managers (212) for very specific conditions that they need to be notified on.

Each time a user updates the main work flow document, they select the type of notification they want to send out. In one embodiment of invention, it is for a 4 Hr Large System (202). Therefore, the only filter rule documents that the system process are for that specific type of notification the user wants to do. The process will return the total document collection for that type of notification, then go thru each field choice in the filter rule and compare to the value(s) in the master work flow document. If the field value in the filter rule doc matches the field value in the work flow document then it returns a true for that field comparison. If all the fields in the filter doc return true when compared against the corresponding work flow document, then the filter rule is processed to send an email to the user or groups of users (212) specified in the filter document. The user can specifically select names to be placed in the Send To field, to be copied, or to be included as a hidden copy. This method allowed for a much greater number of filter rules to be created, being as simple as containing only 1 field value, or being very specific based on the combination of many field values to have a match. This allows a single end user to request email notifications based on information that only that one user requests to see.

Table 1 below is a sample from filter rules view:

0/2 Hr Large System(EMT Check)
4 Hr Large System
4 Hr Non Large System
6 Hr Large System
6 Hr Non Large System
8 Hr Large System
8 Hr Non Large System -continued Daily Update
Heads up Notification
Maintenance Window
Moved back to Down status
Status Resolved In one embodiment of invention, the system groups the filter rules by type of notification being required on the master work flow document. This way, it is possible to build up a set of rules as the work flow document progresses through the process. Think of each heading as a new level, in which case, the rules usually include a larger audience, including more management.

Note that the embodiment of the invention is about a hierarchy of 1 or two levels (basically a flat hierarchy) of individual filter rules as opposed to traditional Tree-based hierarchy. So instead of searching the Tree for a specific set of filter rules via a Tree search method, all the individual filter rules are looked at individually.

The two things that stand out from this new solution for one embodiment are the following:

1. The grouping of the filter rules, allowing for repeating the same rule set, but a changing audience as it progresses between the different types of notifications, as well as major status changes to the master work flow document.

2. By taking these filter rules and comparing them against the fields in the main work flow document. We had users requesting to be notified for only certain customers, but only specific model number systems, and only if the process has been created for more than 8 hours. This user can now create that rule set very specific to their needs. They will be notified of any updates to the master work flow document when the criteria they need are met.

In one embodiment, by combining the above improvements, it provided a unique solution to a current issue and greatly improved the ability to get information to an end user based on their specific criteria.

One embodiment of the invention is a method for matching workflow with grouped filter rules and sending update notification, the method comprising:
presenting filter rule template to a user;
generating filter rules by the user;
storing the filter rules in a database;
comparing a workflow with each of the filter rules; and
generating a notification; wherein the filter rule template comprising first one or more fields; wherein each of the first one or more fields comprising first one or more field values; wherein the user generates the filter rules by selecting the first one or more field values for each of the first one or more fields; wherein the workflow and the filter rules are categorized based on a notification type; wherein the workflow comprising second one or more fields; wherein the second one or more fields comprising second one or more field values; wherein each of the filter rules is compared to the workflow of same the notification type by comparing all of the first one or more fields with all of the second one or more fields; wherein a match is declared in the comparison when each of the first one or more fields of the filter rules are one-to-one identical to each of the second one or more fields of the workflow, and at least one of the first one or more field values of each of the first one or more fields is equal to the second one or more field values of corresponding the second one or more fields; wherein the notification is in form of an email with pre-configured To, Subject, Copy, and Blind-Copy fields; wherein the user's requests or changes are off-loaded to the user or a database owner or administrator; wherein a user-interface is provided for creation of or changes to the filter rules; and wherein the notification corresponds to a group of one or more users based on the one or more users' specific criteria.

A system, apparatus, or device comprising one of the following items is an example of the invention: matching workflow, group filter rules, update notification, database, storing, fields, rules, computer, memory, applying the method mentioned above, for purpose of matching workflow, group filter rules, and update notification/management.

Any variations of the above teaching are also intended to be covered by this patent application.

The invention claimed is:

1. A method for matching workflow document with grouped filter rules, said method comprising:
off-loading to a user or a database owner or administrator a user's request to create or change filter rules fro workflow document;
presenting to said user a filter rule template, comprising first one or more fields, wherein said first one or more fields comprise first one or more values;
generating filter rules by said user by selecting said first one or more field values for each of said first one or more fields;
storing said filter rules in a database;
arranging said filter rules in a flat one level hierarchy so to be searched individually;
categorizing said filter rules based on a first notification type, wherein said first notification type is determined based on a value of a notification field of said first one or more fields;
grouping said filter rules based on said first notification type to allow for second repeating same rule set for a different audience for different types of notifications;
upon an update to said workflow document, which is categorized based on a second notification type, wherein workflow document comprises second one or more fields, wherein said second one or more fields comprise second one or more field values, comparing said workflow document with each of said filter rules of same said first and second notification types by comparing all of said first one or more fields with all of the said second one or more fields; and
generating and sending an update notification corresponding to a group of one or more users based on said one or more users' specific criteria, in form of an email with pre-configured To, Subject, Copy, and Blind-Copy fields; when in said comparison, each of said first one or more fields of said workflow document, and at least one of said first one or more field values of each of said first one or more fields is equal to said second one or more field values of corresponding said second one or more fields.

* * * * *